(12) United States Patent
Rohs et al.

(10) Patent No.: US 6,378,680 B2
(45) Date of Patent: Apr. 30, 2002

(54) DISENGAGEMENT UNIT CLUTCH PRESSURE PLATE AND ACTUATING MECHANISM FOR A DISENGAGEMENT UNIT

(75) Inventors: Ulrich Rohs; Hans Rohs, both of Duren; Dietmar Heidingsfeld, Aachen, all of (DE)

(73) Assignee: Rohs-Voigt Patentverwertungsgesellschaft mbH, Düren (DE)

(*) Notice: Subject to any disclaimer, the term of this patent is extended or adjusted under 35 U.S.C. 154(b) by 0 days.

(21) Appl. No.: 09/730,275

(22) Filed: Dec. 5, 2000

Related U.S. Application Data

(62) Division of application No. 09/293,709, filed on Apr. 16, 1999, now Pat. No. 6,260,683.

(30) Foreign Application Priority Data

| Apr. 17, 1998 | (DE) | 198 17 171 |
| Apr. 22, 1998 | (DE) | 198 17 838 |
| Apr. 24, 1998 | (DE) | 198 18 535 |
| Jul. 8, 1998 | (DE) | 198 30 525 |

(51) Int. Cl.⁷ ............................................. F16D 13/42
(52) U.S. Cl. ..................... 192/85 CA; 192/89.25; 192/91 A; 192/93 B; 192/99 A
(58) Field of Search ................ 192/85 CA, 70.29, 192/89.25, 91 A, 93 B, 99 A

(56) References Cited

U.S. PATENT DOCUMENTS

| 1,913,268 A | | 6/1933 | De Loach | |
| 2,244,169 A | * | 6/1941 | Miller | 192/70.23 |
| 2,329,205 A | * | 9/1943 | Knox | 192/70.23 |
| 2,358,492 A | * | 9/1944 | Gerst | 192/70.24 |
| 2,380,572 A | * | 7/1945 | Barron | 192/70.26 |
| 2,406,238 A | * | 8/1946 | Miller | 192/70.24 X |
| 2,626,692 A | * | 1/1953 | Sloan | 192/93 C |
| 2,682,942 A | * | 7/1954 | Thunstrom et al. | 192/70.23 |
| 4,550,817 A | * | 11/1985 | Euler | 192/70.23 |
| 4,787,492 A | * | 11/1988 | Ball et al. | 192/89.24 X |
| 5,033,598 A | | 7/1991 | Tipton | |

FOREIGN PATENT DOCUMENTS

| DE | 161908 | 11/1904 |
| DE | 477 017 | 5/1929 |
| DE | 879 349 | 6/1953 |
| DE | 893 299 | 10/1953 |
| DE | 1 475 412 | 5/1969 |
| DE | 41 28 880 | 4/1992 |
| DE | 42 43 170 | 6/1994 |
| DE | 195 17 666 | 11/1995 |
| DE | 196 13 763 | 5/1997 |
| FR | 2 753 758 | 9/1997 |
| GB | 301013 | 11/1927 |

* cited by examiner

*Primary Examiner*—Rodney H. Bonck
*Assistant Examiner*—Saúl Rodriguez
(74) *Attorney, Agent, or Firm*—Collard & Roe, P.C.

(57) ABSTRACT

A clutch having narrow housing and including a disengagement unit for a clutch pressure plate with a device for applying an essentially radially directed force onto the pressure plate, and wherein the device is driven in a radial direction.

1 Claim, 7 Drawing Sheets

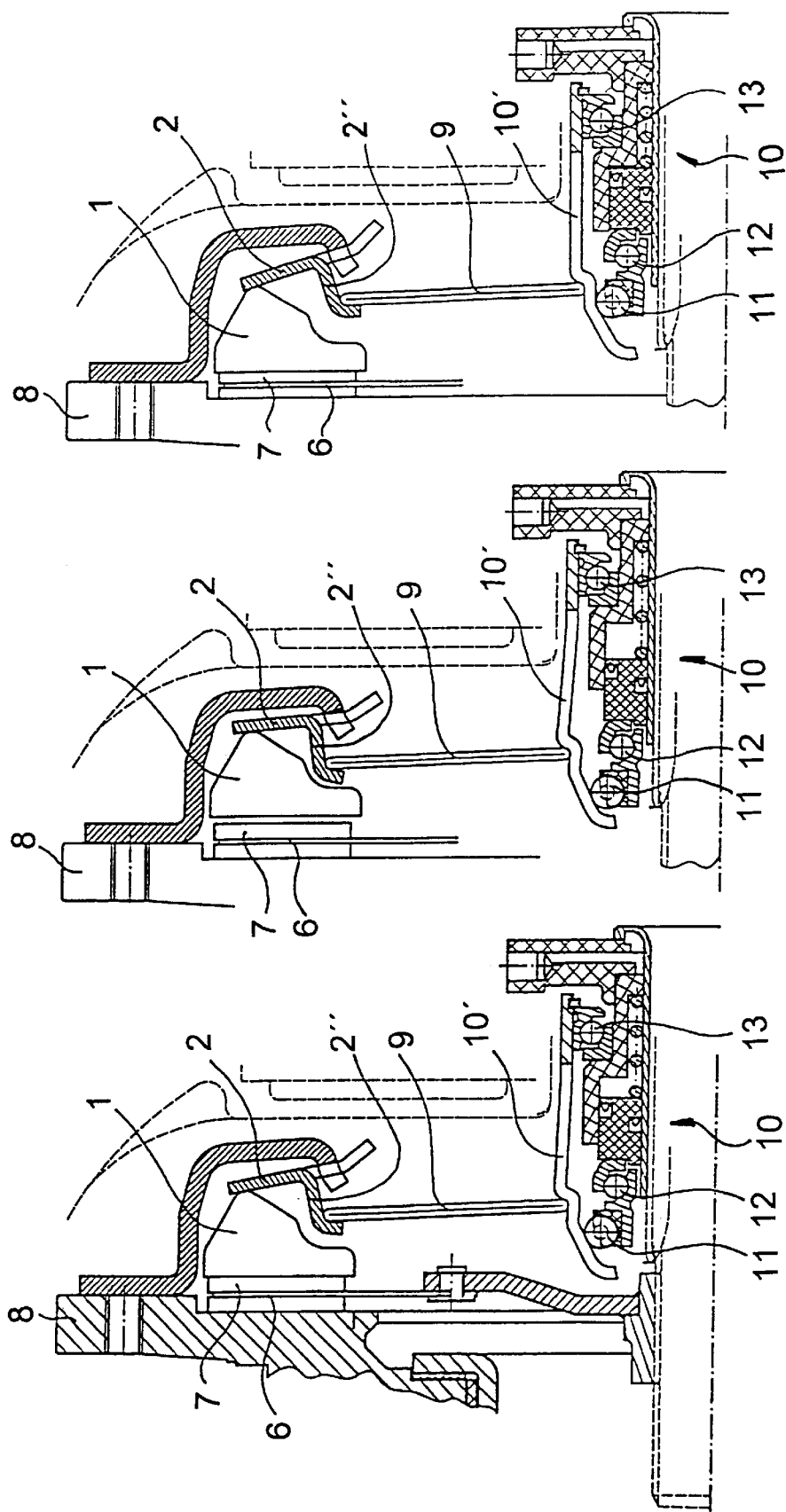

DISENGAGEMENT UNIT CLUTCH PRESSURE PLATE AND ACTUATING MECHANISM FOR A DISENGAGEMENT UNIT

CROSS REFERENCE TO RELATED APPLICATIONS

This is a divisional of U.S. patent application Ser. No. 09/293,709, filed on Apr. 16, 1999 now U.S. Pat. No. 6,260,683 and benefit is claimed under 35 U.S.C. §120. Benefit is also claimed under 35 U.S.C. §119 of German Application Nos. 198 17 171.4, 198 17 838.7, 198 18 535.9 and 198 30 525.7, filed on Apr. 17, 1998, Apr. 22, 1998, Apr. 24, 1998 and Jul. 8, 1998, respectively.

BACKGROUND OF THE INVENTION

1. Field of the Invention

This invention relates to a disengagement unit for a clutch pressure plate, and an actuating mechanism for a disengagement unit.

2. The Prior Art

Disengagement units of this type for clutch pressure plates usually include a disk spring tensioned between the clutch pressure plate, and a clutch housing, which presses the clutch pressure plate against a friction plate of a clutch. In this situation, the disk spring is mounted on the clutch housing by means of a fixed bearing, and is disengaged by means of a disengagement device taking effect in an axial direction, by means of tongues pointing inwardly.

Because of the lever lengths involved, clutches of this type have relatively long constructional lengths. Added to this constructional length incurred by the levers because of lining wear, the disk spring has a considerable angular movement, which must likewise be accommodated by the clutch. In addition, the overall arrangement of the clutch has tolerance values between the clutch housing and the central disengagement device which must likewise be compensated for over the constructional length.

SUMMARY OF THE INVENTION

It is an object of the present invention to provide for the narrowest possible constructional design for a clutch of the corresponding type.

The present invention provides a disengagement unit for a clutch pressure plate in which the force is essentially applied in an axial direction and are essentially driven in a radial direction.

The invention includes a force converter, capable of converting a force with a radial component into a force applied axially onto the pressure plate, and by a force generator which is capable of taking effect on the force converter by a force with a radial component.

Because the force which is applied in an axial direction has a radial drive unit, there is a radial displacement of the arrangement if a drive of this nature is applied. This arrangement according to the invention provides a shorter construction length than with known brake actuation mechanisms, since the space required for actuation is essentially in the radial direction.

In particular, correspondingly less housing space is required in the axial direction for readjustment due to wear.

In addition, a provision can be made at the transition point between the force converter and the force generator for an axial displacement or compensatory movement, which will make up for wear to the clutch linings. In this context, the arrangement according to the invention eliminates any idle movement in whole or in part, and therefore eliminates the need for any additional constructional length.

A displacement or compensatory movement can be provided, in that the radially driven device follows the displacement, for example, due to wear, with an axial component, while a corresponding radial drive remains essentially fixed in position.

As a further solution, the invention provides a method of actuation for a disengagement unit which can be used with two guide elements that can be displaced axially to one another, and with a converter connected to the guide elements so that a relative axial movement of the guide elements is converted into a radial movement of the converter. In this way, the disengagement unit has a corresponding radial drive element.

This arrangement, thus eliminates large lever paths, since the converter takes effect essentially in a radial direction. Because the guide elements can be displaced axially in relation to one another, guide elements can be designed to be almost free of forces from the outside. In addition, this arrangement is only minimally affected by centrifugal forces, since the guide elements need only carry out an axial movement, and centrifugal forces can only be applied to a disadvantage on the converter. By means of an appropriate arrangement of the converter, e.g. by means of rotational symmetry, the converter can be designed so that it can compensate for any centrifugal forces.

In addition, an actuation means is provided for a disengagement unit of a clutch pressure plate with a device for the application of a force axially onto the pressure plate, and with a central disengagement element, in which the device for providing an essentially axially directed force are combined with the central disengagement element by means of a disk spring. The disk spring can be arranged in a radial manner, to achieve the maximum possible reduction in constructional length of the housing.

This arrangement is of particular advantage if the device that provides for the application of an essentially axially directed force uses a disk spring. The force flow is then effected by two disk springs from the central disengagement element.

To facilitate installation, both the central disengagement element and the device for applying an essentially axially directed force may have a shoulder on which the disk spring can come in contact during installation. The disk spring can, for example, be disposed on the shoulder of the device that provides the axially directed force, and then positioned by means of the shoulder of the central disengagement element, while the central disengagement element is brought into its installation position.

In addition, actuating a means is provided for an axially effective clutch pressure plate, with a device for applying the force axially onto the pressure plate, and is mounted in a clutch housing, and connected with a disengagement element via a location provided for outside the bearing mount.

In this way, torque can be applied onto the device that applies the axial force so that the bearings need only work against a counter-pressure, if the torque is applied onto the device for applying an essentially axial force by the disengagement element.

The invention, has the advantage that the fixed bearings or counter-bearings can be done away with when the plate spring or disk is mounted since an essentially axially directed force, is applied when the disk spring takes effect on the clutch pressure plate. Since additional space is required for fixed bearings or counter-bearings of this type, this arrangement will further reduce the axial constructional length of the clutch according to the invention. In addition, eliminating fixed or counter-bearings will also result in a correspondingly simplified assembly, and a reduction in costs.

The invention, which has the advantage of eliminating a lever which had to be actuated axially, and which meets the axially applied forces on the clutch pressure plates, further serves as a vibration filter, so that the vibrations produced by the crankshaft, which could otherwise be transferred to the central disengagement element and to the clutch pedal, are absorbed in the transition between the device for applying the axially applied force, and the central release element.

BRIEF DESCRIPTION OF THE DRAWINGS

Other objects and features will become apparent from the following detailed description considered in connection with the accompanying drawings which disclose the embodiments of the invention.

In the drawings, for instance, similar reference characters denote similar elements throughout the several views:

FIG. 1a is an arrangement according to FIG. 1, in the same representation as FIG. 1;

FIG. 1b the arrangement according to FIG. 1 in the actuated state;

FIG. 1c is an arrangement according to FIG. 1 after wear;

DETAILED DESCRIPTION OF THE PREFERRED EMBODIMENT

Figure 4:
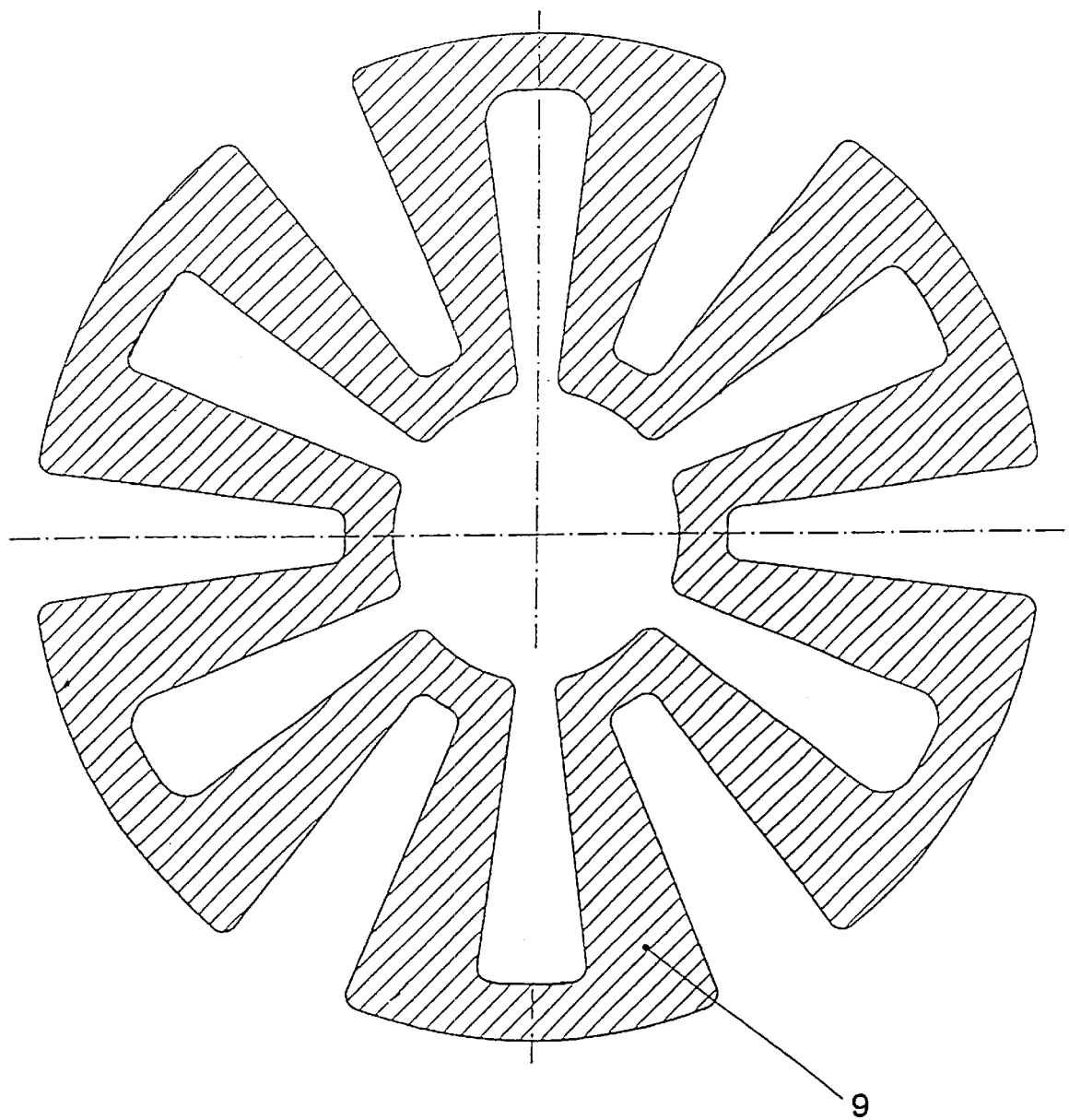
FIG. 4 is a disk spring in a plan view, serving as a slide or ram element.

Returning to FIGS. 1 to 1c, a carrier disk 6 is shown with its two friction liners 7 is clamped between a clutch flange 8 and a pressure plate 1. A corresponding initial tension is provided by a disk spring 2, which supports at a point of rotation 3, a clutch housing 8', and serves as a disengagement unit. To disengage the clutch, disk spring 2 is disengaged, so that the clamping tension between clutch flange 8 and pressure plate 1 is relieved (see FIG. 1b). This comes about by a disk spring 9 (as shown by way of example in FIG. 4) being actuated by a central disengagement element 10, and therefore deflecting lever 2" of disk spring 2 in an axial direction towards the pressure plate. When the clutch is re-engaged, this process takes place in the reverse direction.

As can be seen, disk spring 2 is located at the height of the point of rotation 3 only at the clutch housing. To stabilize disk spring 2, it is provided with tongue elements 2'.

Central release element 10 has as deflectors, several tongue elements 10', connected with one another via a cylindrical area. These tongue elements 10' are supported on the one hand by means of a cylindrical area 10" on a ball bearing 13, and, on the other, by means of an area 10" and rollers 11 running obliquely on a ball bearing 12. Cylindrical area 10" is secured to ball bearing 13 by means of a locking ring 14. The two ball bearings 12, 13 are capable of being moved by hydraulic means, axially against one another, by means of a plunger 5 and a spring 4. These ball bearings 12 and 13 act on plunger 5 and spring 4 to form axially displaceable guide elements. Instead of the hydraulic drive, however, any possible form of drive is possible, and in particular a mechanical, pneumatic, or electrical drive can be used.

At an axial movement of the ball bearing 12, rollers 11 roll along inclined sections 10''' of the tongue elements 10', and the axial movement is transformed into a radial movement of tongue elements 10'. As a result, disk spring 9 is driven. As can be seen, the relative axial movement of ball bearings 12, 13 takes place outwards free of force, so that central release element 10 needs to be held in its central position only with substantially less strength. In particular, a clip or catch connection is even sufficient to provide this securing arrangement.

In the event of wear (see FIG. 1c), plunger 5 is further engaged inwards by disk springs 2 and 9. As can be seen, the path lengths which result in this situation are substantially smaller than if a lever were to be run from disk spring 2 as far as plunger 5, as is the case with the state of the art devices.

In this case, and during assembly, disk spring 2 can come in contact with a stop 8", which is formed by a corresponding angle formation of the housing 8'.

Disk spring 9 is designed so that it is conical in its non-tensioned state. To assemble, disk spring 9 need only be brought against a radial shoulder with lever 2" of disk spring 2, and is then supported by a corresponding shoulder of central release element 10, when this is used. When central release element 10 reaches its assembly position, disk spring 9 is also in the position shown in FIG. 1.

Figure 2:
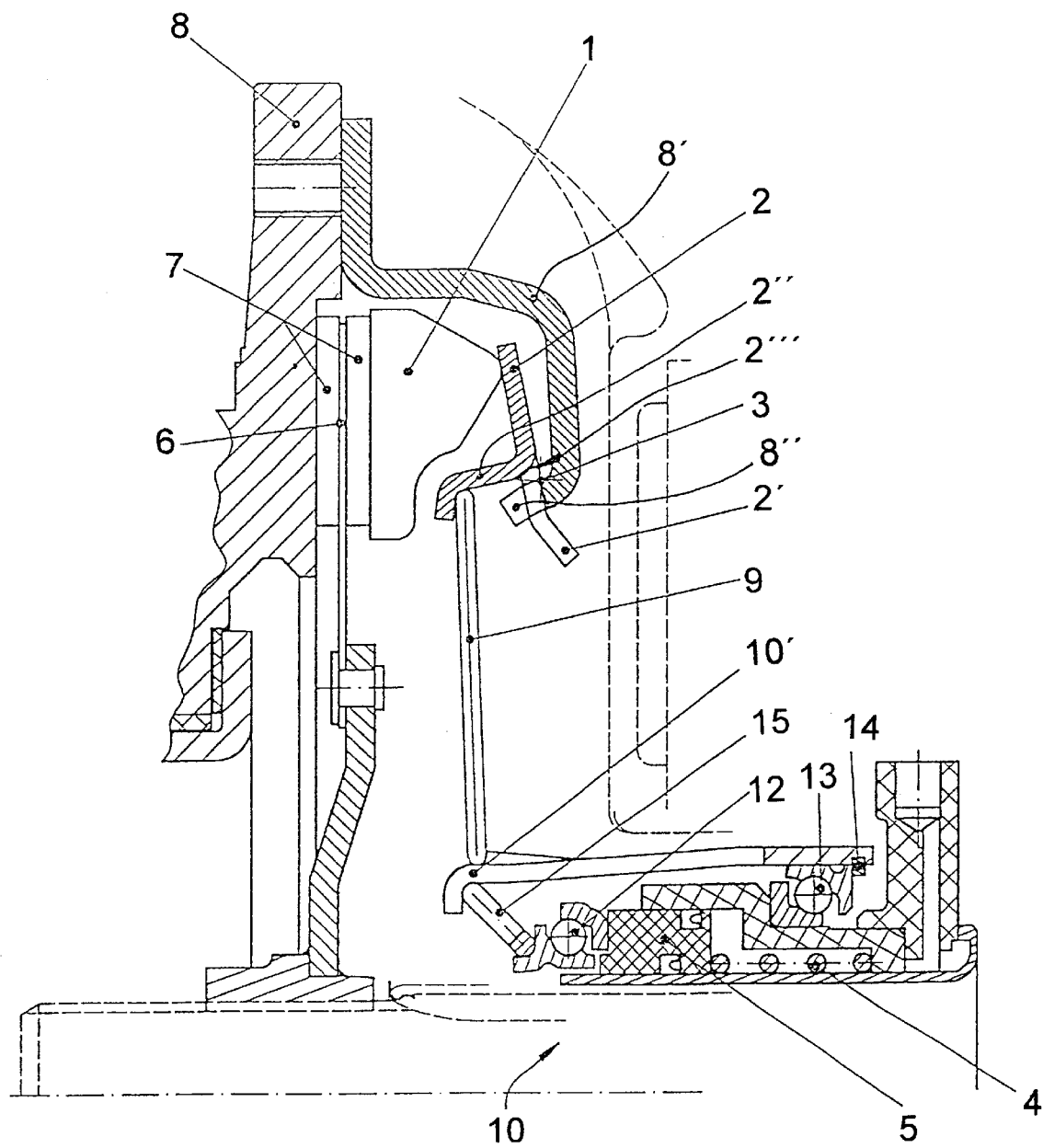
FIG. 2 is a further disengagement unit and a further actuation according to the invention of a disengagement unit, in a similar representation as FIG. 1.

The embodiment shown in FIG. 2 corresponds essentially to the embodiment described previously. Only the assembly shoulder of central disengagement element 10 is used as a lever instead of roller 11.

Figure 3:
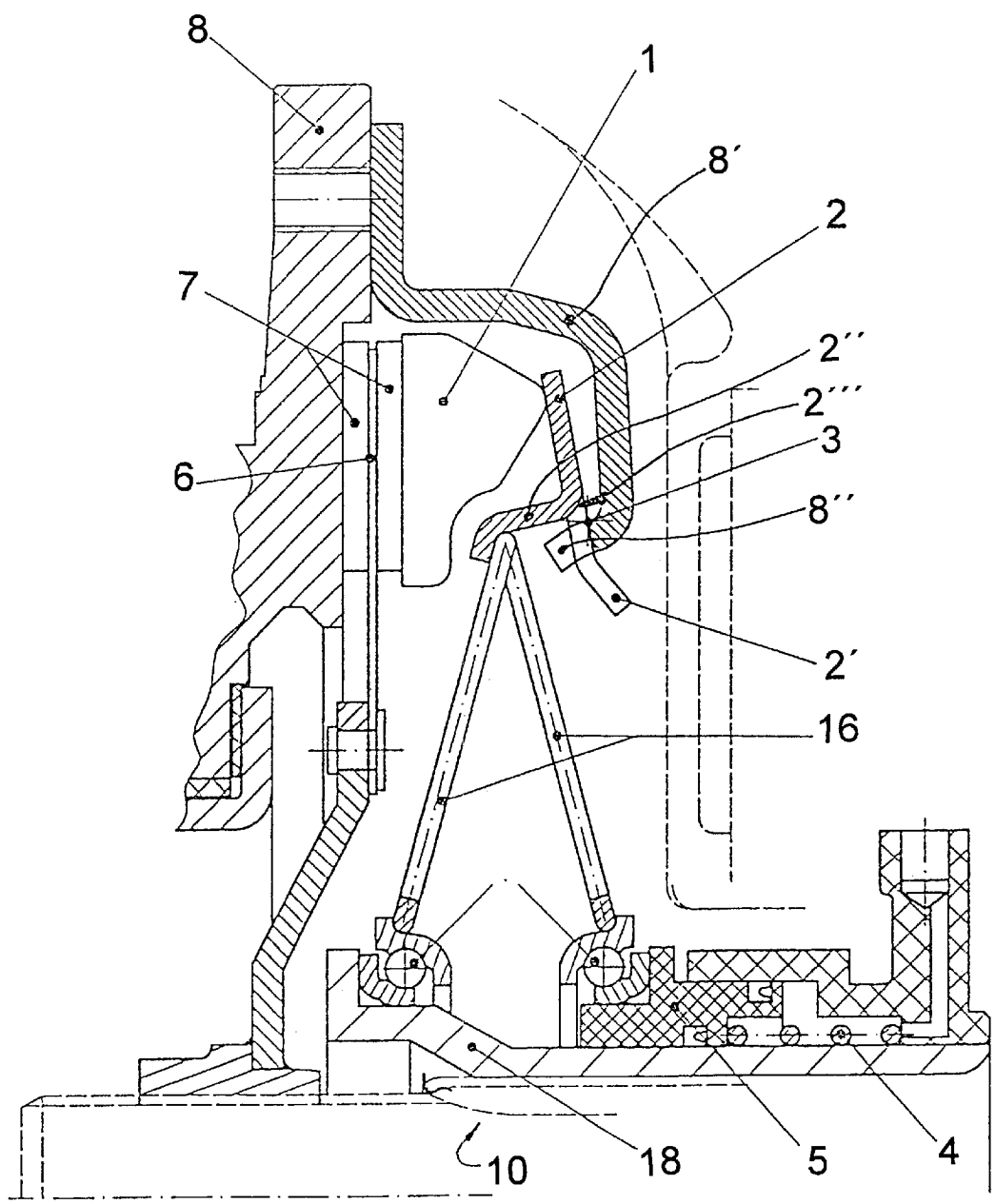
FIG. 3 is a third disengagement unit and a third actuation of a disengagement unit, in a similar representation to FIG. 1.

In the embodiment of FIG. 3, in contrast with the previous embodiments, the centrifugal forces play only a subordinate role. In this embodiment, a disk spring 16, shown as two disk springs angled against one another, is supported directly on ball bearings 17, which are capable of being displaced axially against one another on a central retaining device 18 with the ball bearings 17 and central retaining device 18 forming axially displaceable guide elements. The centrifugal forces which are encountered in disk spring 16 are largely compensated for in this embodiment of disk spring 16.

Figure 1:
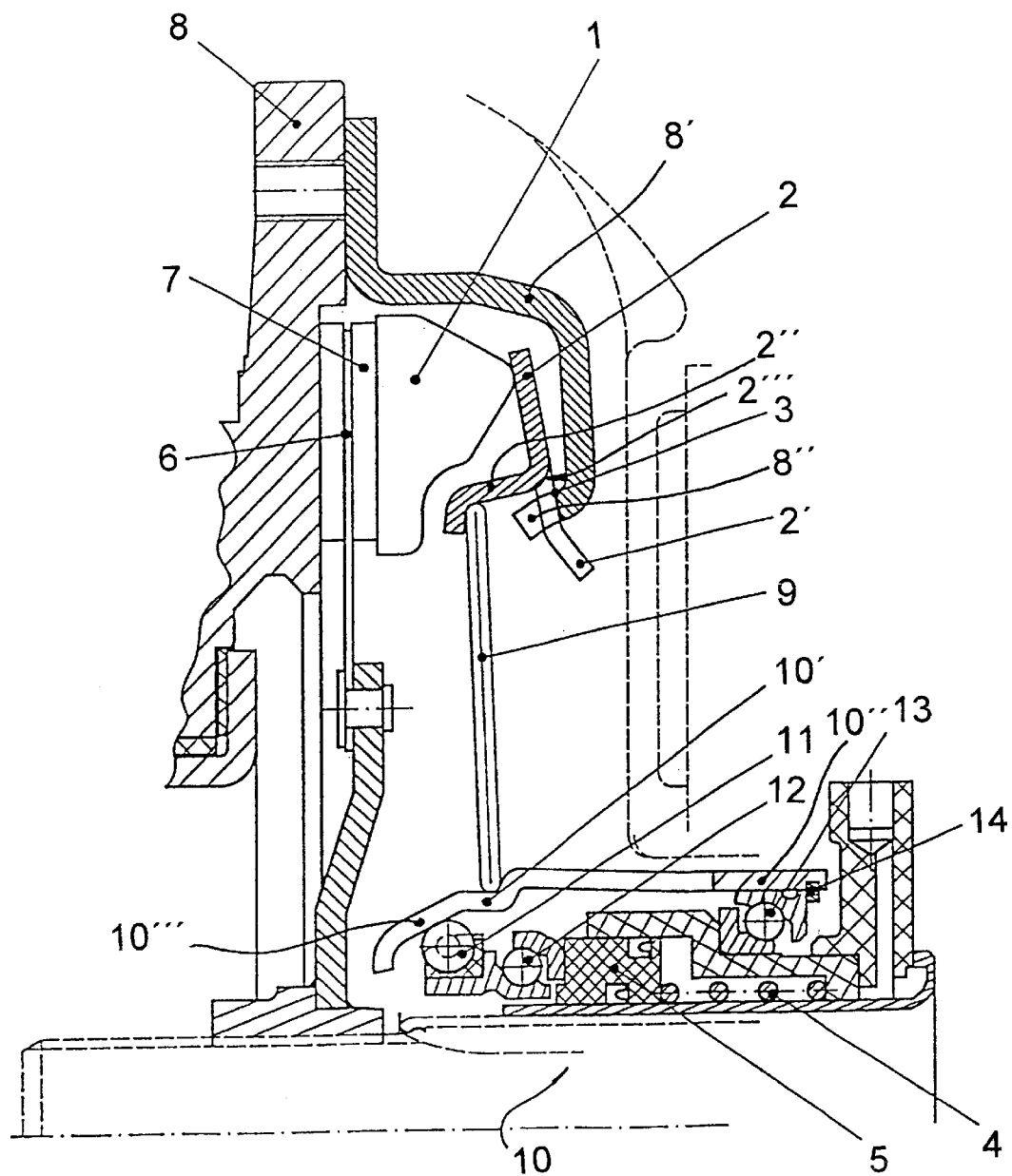
FIG. 1 is a disengagement unit and actuation of a disengagement unit as a sectional view.
Figure 5:
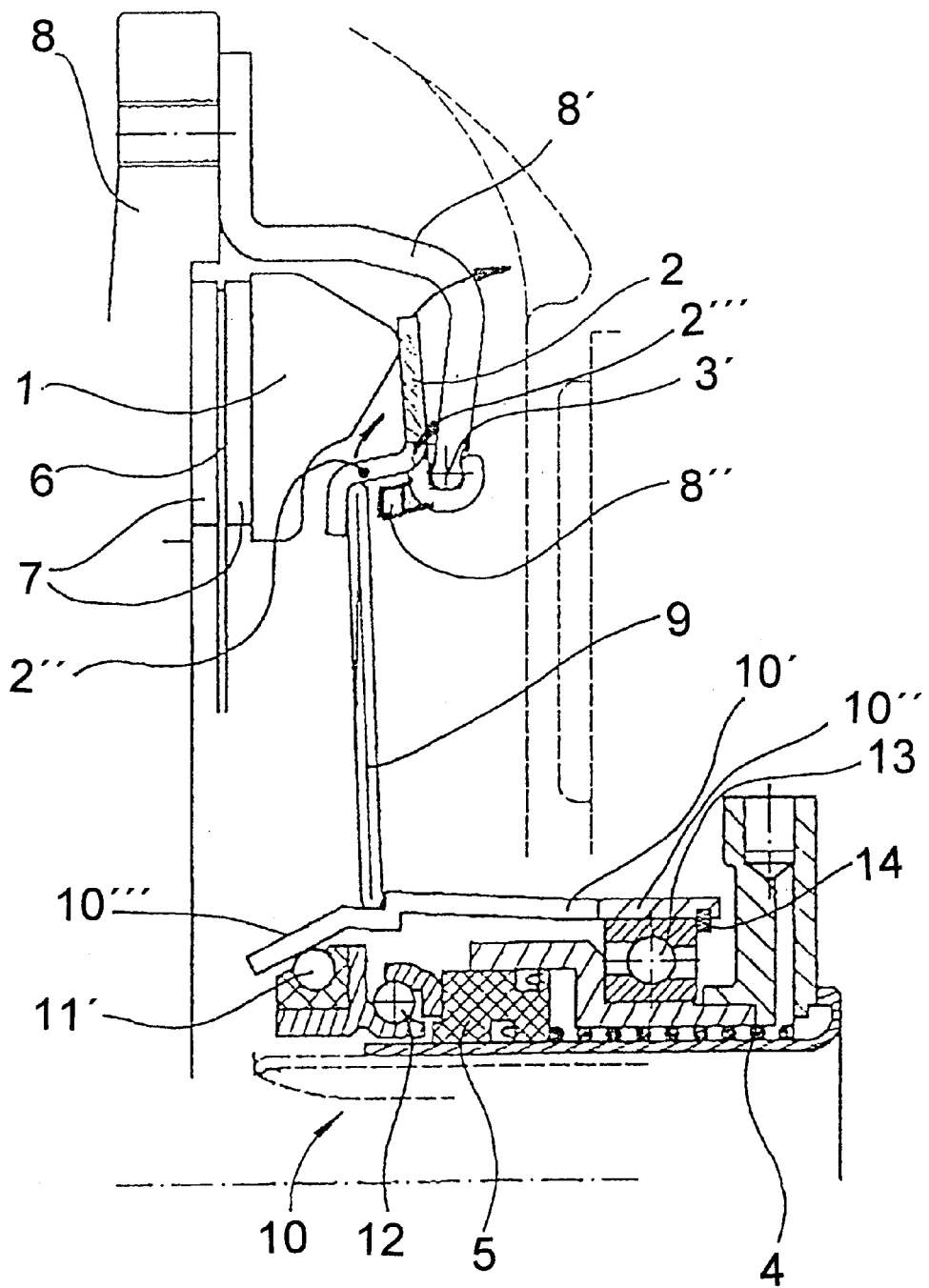
FIG. 5 is a fourth disengagement unit and a fourth actuation for a disengagement unit, in a similar representation as in FIG. 1.
Figure 6:
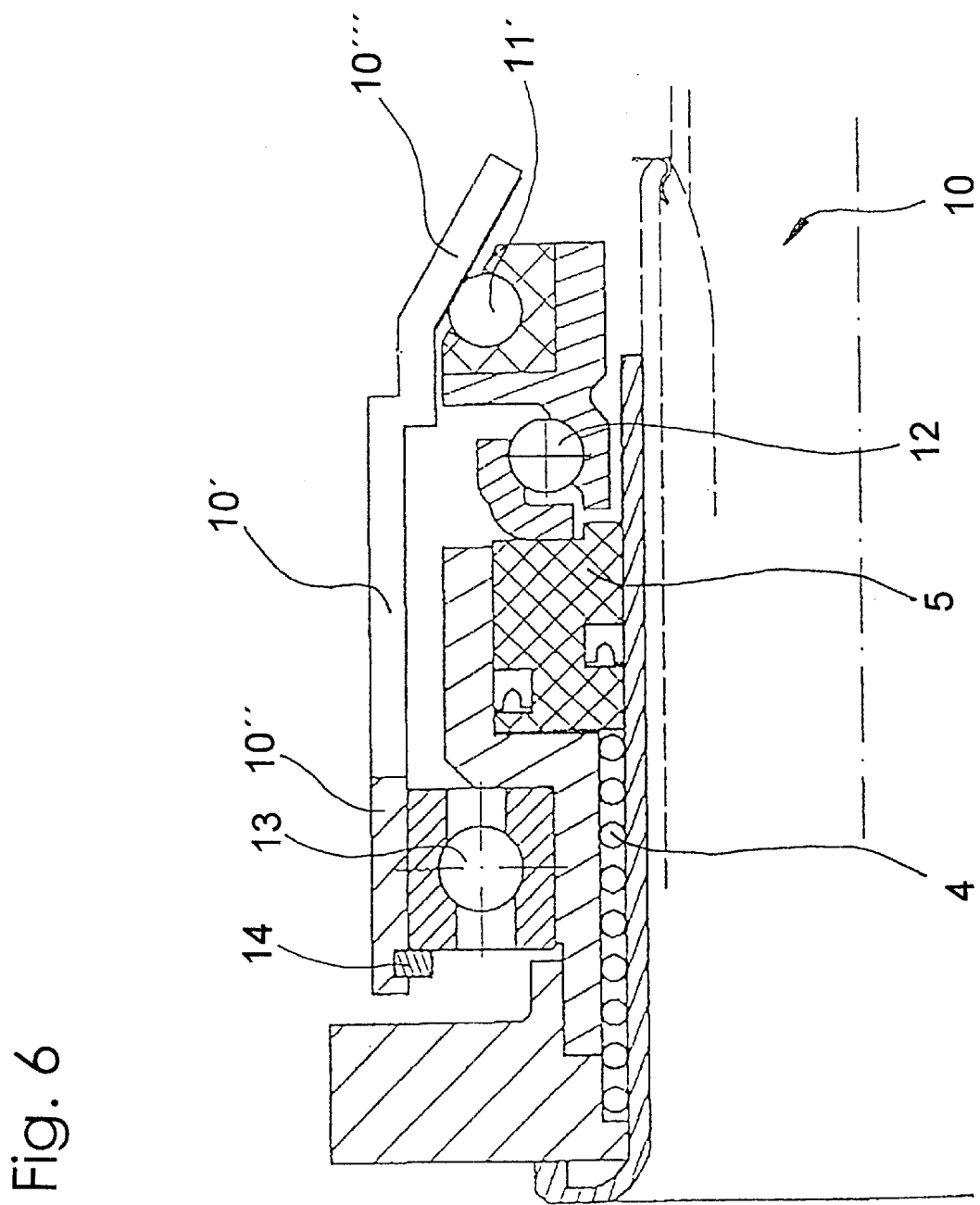
FIG. 6 shows a detailed view of the arrangement according to FIG. 5.

The embodiment shown in FIGS. 5 and 6 corresponds essentially to the embodiment of FIG. 1, except that, instead of rollers 11, ball bearings 11" are provided to support the oblique area 10'''. In addition to this, spring 4 is supported at another point of central disengagement element 10.

Moreover, with this embodiment, the disk spring is mounted on housing 8' by means of a fixed bearing 3'. As indicated by the arrows, the force relationships, determined by the force which disengages one of disk springs 2, takes effect radially on contact point 2''', outside bearing point 3' (or 3 respectively), so that at this point, a simple support on housing 8' would be sufficient.

While only a few embodiments of the invention have been disclosed and described, it is obvious that many changes and modifications may be made thereon to without the parting from the spirit and scope of the invention.

What is claimed is:

1. An externally driven actuator for a disengagement unit and a clutch pressure plate having a disk spring, the actuator comprising:

a) a pair of guide elements capable of being displaced axially against one another wherein each guide element comprises:
      i) a ball bearing disposed in the disengagement unit;
      ii) at least one radial plunger disposed in the disengagement unit with a first end of said radial plunger disposed adjacent to said ball bearing and a distal end disposed adjacent to the disk spring; wherein said distal ends of said at least one radial plunger are coupled together;

b) at least one axial plunger disposed adjacent to at least one of said ball bearings wherein said at least one axial plunger and said at least one radial plunger are angled against one another;

said axial plunger moves, said ball bearings move against each other to create a relatively radial movement of said radial plungers which is converted into an axial force on said converter to create a radial movement of said converter which translates into an axial movement on said pressure plate.

* * * * *